United States Patent
Matsumoto et al.

[11] Patent Number: 6,053,002
[45] Date of Patent: Apr. 25, 2000

[54] APPARATUS FOR CONTROLLING AN AIR CONDITIONER

[75] Inventors: Satoshi Matsumoto, Oota; Kouichi Matsumoto; Tomonori Isobe, both of Kumagaya; Hiroshi Yoshida, Oota; Manabu Ishihara, Isesaki; Yuki Takatsu; Eiji Kawabe, both of Ora-gun, all of Japan

[73] Assignee: Sanyo Electric Co., Ltd., Osaka, Japan

[21] Appl. No.: 09/234,635

[22] Filed: Jan. 21, 1999

[51] Int. Cl.[7] .................................................. F25B 49/02
[52] U.S. Cl. ............................ 62/230; 62/228.4; 318/803
[58] Field of Search ............................... 62/230, 125, 126, 62/127, 129, 228.1, 228.4, 208, 209; 307/31, 33, 35; 318/801, 802, 803, 807, 811; 363/109

[56] References Cited

U.S. PATENT DOCUMENTS

| | | | |
|---|---|---|---|
| 5,199,274 | 4/1993 | Yoshida et al. | 62/228.4 |
| 5,209,075 | 5/1993 | Kim | 62/230 X |
| 5,493,868 | 2/1996 | Kikuiri et al. | 318/807 X |
| 5,560,218 | 10/1996 | Jang | 62/230 X |

*Primary Examiner*—Harry B. Tanner
*Attorney, Agent, or Firm*—Wenderoth, Lind & Ponack, L.L.P.

[57] ABSTRACT

There is provided a controlling apparatus for an air conditioner, which comprises: an inverter circuit for feeding as an output a pseudo-sine wave from a switching signal obtained by comparison between a modulated wave and a carrier wave; a refrigeration cycle device which has a compressor driven by the pseudo-sine wave from the inverter circuit so that the modulated wave is adjusted according to a load of an air conditioner; and a correction device for correcting an amplitude of the modulated wave into a smaller one at a predetermined time when a rated voltage of the power source from the inverter circuit is larger than a rated voltage by a first predetermined value, and correcting the modulated wave into a larger one at a predetermined time when a rated voltage of the power source from the inverter circuit is smaller than the rated voltage by a second predetermined value. The predetermined time is elongated as the difference between the aforementioned power source voltage and the rated voltage becomes larger, so that shutdown of the compressor is restricted at the voltage variation of the power source.

3 Claims, 11 Drawing Sheets

Power Source Voltage

| Zones | Standards of Judgement |
|---|---|
| HI | $V_{AC}$ > reference voltage+a% |
| MID | reference voltage+a% ≧ $V_{AC}$ ≧ reference voltage−b% |
| LOW | reference voltage−b% > $V_{AC}$ |

| Zones | State of Switches | Output to Microcomputer |
|---|---|---|
| HI | PC1−ON<br>PC2−OFF | $V_{out}$=VH |
| MID | PC1−ON<br>PC2−ON | $V_{out}$=VM |
| LOW | PC1−OFF<br>PC2−ON | $V_{out}$=VL |

| F0 Value of corrected zone<br>- Present F0 value | Adjustment Value |
|---|---|
| x7 and above | +n4 |
| x5 to x6 | +n3 |
| x3 to x4 | +n2 |
| x1 to x2 | +n1 |
| 0 (zero) | 0 |
| -x2 to -x1 | -n1 |
| -x4 to -x3 | -n2 |
| -x6 to -x5 | -n3 |
| -x7 and below | -n4 |

APPARATUS FOR CONTROLLING AN AIR CONDITIONER

BACKGROUND OF THE INVENTION

1. Field of the Invention

The present invention relates in general to an air conditioner and more particularly to an apparatus for controlling the air conditioner in response to a variance of an electric voltage supplied to the air conditioner from a power source.

2. Prior Art of the Invention

An air conditioner of the type which is called as a separation-type air conditioner is constructed primarily of an outdoor unit and a room unit and these two units are composed of devices and appliances which constitute a refrigeration cycle, as compressors, and are connected with each other by refrigerant pipes and demand signal wires.

The room unit has a room side heat exchanger, a fan motor, a room fan which is driven by the fan motor and circulates the air heated/cooled by the room side heat exchanger, a port for connection of refrigerant pipes, a room side controller, etc.

The outdoor unit has an outdoor heat exchanger, an outdoor fan which is composed of a motor and propeller fan, for facilitating the heat exchange between the outdoor air and the outdoor side heat exchanger, a compressor, a motor for driving the compressor, four-way valves for switching the circulating direction of the refrigerant, a check valve (non-return valve) for limiting the circulation direction of the refrigerant, an electromagnetic valve for controlling a flow rate of the refrigerant which is supplied to the room unit, a capillary tube (an expansion device), a strainer, a port for connection of refrigerant pipes, an accumulator, a muffler, and an outdoor side controlling device (outdoor unit control board), and the devices described above are connected with each other directly or indirectly so that a predetermined refrigeration cycle is formed.

A detailed description of the refrigeration cycle will be omitted for simplification only because a generally known refrigeration cycle can be used in the air conditioner of present invention.

In a cooling operation, the refrigerant discharged out of the compressor is condensed by the outdoor heat exchanger and expanded by the capillary tube and then evaporated by the room side heat exchanger, so that a cooling operation is achieved in the room to be air conditioned.

In a heating operation, the refrigerant discharged from the compressor is condensed by the room side heat exchanger and expanded by the capillary tube and then evaporated by the outdoor side heat exchanger. A heating operation for a room to be air-conditioned is accomplished by utilizing the heat of condensation at the time of condensation of the refrigerant by the room side heat exchanger.

In order to proceed cooling, heating or drying operations (wherein the drying operation is conducted by using the same refrigerant flow as the cooling operation and automatically controlling a blowing rate of the room fan) in a separate type air conditioner having a room unit and outdoor unit as described above, a controlling signal is transmitted from the room unit to the outdoor unit through a communication line. A general electric circuit of the air conditioner to which the present invention relates will be described with reference to FIG. 1.

In FIG. 1, a signal from the room unit 2 is supplied to a terminal ③ of a terminal plate A (connector 6) through a signal line and then transmitted to a serial communication circuit of a control portion (outdoor unit control substrate 3) of the outdoor unit 1. Besides, an electric power which is controlled by the room unit 2 is supplied to a terminal ① and a terminal ② of the terminal plate B through terminals ① and ② of the terminal plate A (connector 6) and is supplied through a noise filter to a rectifying circuit 8 and an inverter circuit 9 for driving the compressor 5.

When a power source of 200 V of a single phase is connected to the terminal plate B, the rectifying circuit 8 is switched to comply with the 200 V of a single phase and the connection between the terminal plate A and the terminal plate B is cut off.

The controlling portion (outdoor unit control substrate) 3 of the outdoor unit 1 which receives an operation demand is controlled with respect to a rotational speed of the outdoor fan motor 7, an opening degree of the refrigerant controlling electromagnetic valve 4 which controls a flow rate or an expansion amount of these refrigerant, and an operational capacity (rotational speed) of the compressor, so that a room temperature is shifted to a set temperature which is predetermined in the room unit 2.

In FIG. 2 showing a principal portion of an electric circuit of the control portion which is mounted on the room unit 2, a microcomputer 21 is provided with a switch device for setting a basic mode of the air conditioner, an operational display and an electric circuit which receives a signal from a remote controller (not shown).

The microcomputer 21 serves to control the operation of the air conditioner in accordance with the signal transmitted from the remote controller. Based upon the setting of operations of cooling/heating/blowing, a flowing direction of the refrigerant is changed, by way of the terminal 3 of the connector 6A in case of a heating operation, and a signal for switching ON the four-way valve is transmitted to the control portion of the outdoor unit 1 so that a cooling operation and a heating operation are switched by the four-way valve.

A stepping motor 23 serves to change an angle of the flap to change vertically and transversally the discharge direction of the conditioned air which is discharged from the room unit 2. A motor 22 drives a cross flow fan for a blowing operation and its rotational speed is automatically or otherwise optionally controlled. A driving circuit for this motor 22 is controlled by the microcomputor 21. In the figure of the drawing, reference characters TH1 and TH2 are temperature sensors which detect a room temperature and a temperature of the refrigerant heat exchanger, respectively.

In FIG. 3 which shows an electric circuit of a principal portion of the controlling portion of the outdoor unit 1, a connector 6B is connected with the connector 6A of the connecting portion of the room unit 2 shown in FIG. 2 such that the terminals of the same terminal number in connectors 6A and 6B are connected with each other. Here, the terminal plate 6B is shown as being a combined structure between the terminal plates A and B in FIG. 1.

The serial circuits are provided for the purpose of communication between a microcomputer 21 of the room unit 2 and a microcomputer 31 of the outdoor unit 1, and the room unit 2 is provided with a serial circuit 20 and the outdoor unit 1 is provided with a serial circuit 30.

The microcomputer 31 of the outdoor unit 1 serves that its operation demand is transmitted from the room unit through the serial circuit 30 to control the compressor motor 5, four-way valve switching solenoid RV, and the fan motor 7.

The compressor motor 5 uses an AC motor, and DC power which is voltage doubler rectified by a rectifier circuit 8 is converted to an AC power of pseudo-sine wave based upon the PWM theory by an inverter circuit 9 and then supplied. The fan motor 7 is a brushless DC motor and its rotational speed is controlled in accordance with signals from the microcomputer.

The four-way valve switching solenoid RV serves to switch the state of the four-way valve in accordance with the transmission direction of an electric power. Accordingly, switching of the transmission direction of the electric power of the solenoid RV permits the refrigeration cycle to be changed to heating/cooling operation. Reference characters TH3, TH4 and TH5 are temperature switches each of which serves to detect the temperature of its predetermined portions and transmit the detected data to the microcomputer 31.

In the air conditioner constructed as described above, when the power source voltage supplied to the driving source such as the compressor motor and so forth is varied extensively to a protection range beyond a normal operation region, in other words, if the voltage is raised more than the predetermined value relative to a reference voltage, an over-voltage is added to windings of the motor with a result of possible burning of the motor, and if the voltage drops below the predetermined value relative to a reference voltage, it results in lacking of motor torque and stalling torque (locking) for the motor.

SUMMARY OF THE INVENTION

An object of the present invention is to provide a new controlling apparatus which permits overcoming the defects and difficulties in the conventional controlling apparatus for the air conditioner.

Another object of the present invention is to provide an improved controlling apparatus for an air conditioner which permits continuous operation without cutting-off a supply of an electric power to the compressor motor, etc. when a power source voltage is varied beyond a normal operation range and into a protective operation range so that an electric power supply to the compressor motor, etc. is maintained with the appliances being protected and that the electric voltage supplied to the compressor motor is adjusted to maintain the operation as long as possible.

According to the present invention, there is provided a controlling apparatus for an air conditioner, comprising:

an inverter circuit means for outputting a pseudo-sine wave from a switching signal obtained by comparison between a modulated wave and a carrier wave, a refrigeration cycle means having a compressor driven by the pseudo-sine wave from the inverter circuit means, so that the modulated wave is adjusted in accordance with an air conditioning load, correction means for correcting an amplitude of the modulated wave into a smaller one at a predetermined time when a rated voltage of the power source from the inverter circuit means is larger than a rated voltage by a first predetermined value, and correcting the amplitude of the modulated wave into a larger one at a predetermined time when a rated voltage of the power source from the inverter circuit means is smaller than the rated voltage by a second predetermined value, and elongating the predetermined time as the difference between the aforementioned power source voltage and the rated voltage becomes larger so that shutdown of the compressor is restricted at the voltage variation of the power source.

In a preferred embodiment, a protection means is provided for shutting down the compressor when time duration that the power source voltage is more than the first predetermined value or lower than the second predetermined value is arrived at a predetermined time duration.

In another preferred embodiment of the invention, the protection means is provided for shutting down the compressor when the power source voltage is more than a third predetermined value higher than the first predetermine value or the power source voltage is less than a fourth predetermined value smaller than the second predetermined value.

PREFERRED EMBODIMENTS OF THE INVENTION

Figures 4A, 4B, 4C:
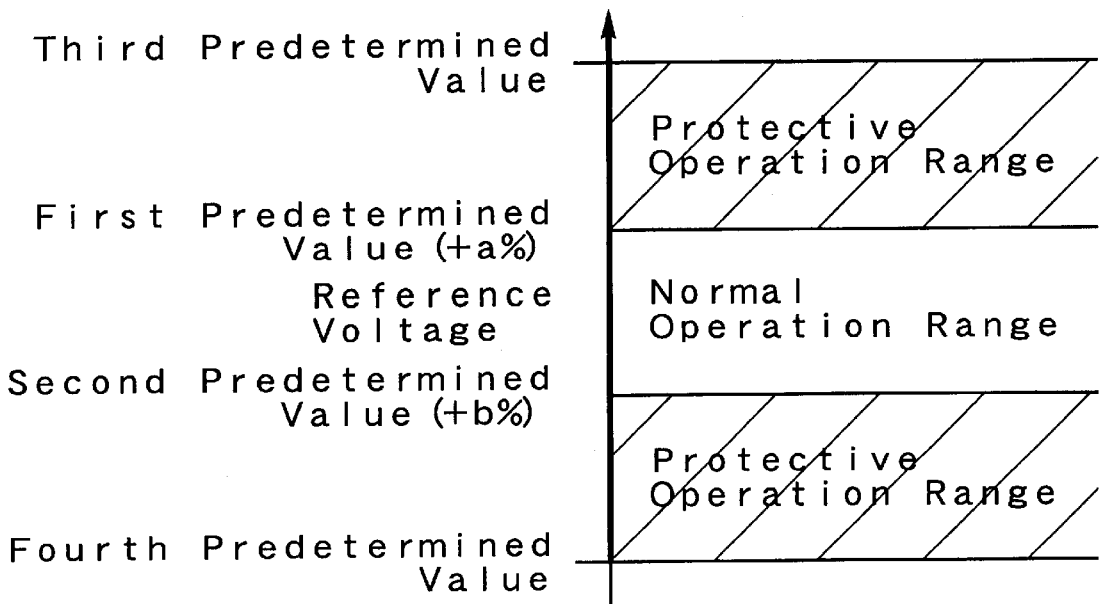
FIGS. 4(A), 4(B) and 4(C) are diagrams showing judgement of variation of the power source voltage.

An outline of judgement of variation in the power source voltage according to the present invention will be described with reference to FIGS. 4(A), 4(B) and 4(C). In FIG. 4 (A), a controlling operation including a protection operation is carried out by dividing the power source voltage which is supplied to a driving source such as a compressor, etc. into a normal operation range and a protective operation range.

The "normal operation range" of the power source voltage is intended to mean a predetermined range of predetermined +a% (first predetermined value) and a predetermined −b% (second predetermined value) relative to the reference voltage, and the "protective operation range" is intended to mean a range which is +a% above the reference voltage and a range which is −v% below the reference voltage. The values of "a" and "b" are determined by conditions of the power source and the using conditions of the devices. For example, supposing that the reference voltage is AC 220 V, the values "a" and "b" are set for every reference voltage such as a=15 and b=20.

Additional predetermined values, that is, a third predetermined value and a fourth predetermined value are provided outside the first and second predetermined values. When the power source voltage extends beyond the third and fourth predetermined values, the protection means is activated to shutdown the compressor.

Supposing that there are three operational ranges as shown in FIG. 4(B) and the current power source voltage is represented by VAC, the ranges can be defined by the inequities as set forth below according to the judgement standards of FIG. 4(B):

(1) a range of: a third set value>$V_{AC}$>reference voltage +a% is determined as HI zone;

(2) a range of: a reference voltage +a% ≧$V_{AC}$≧reference voltage −b% is determined as MID zone; and (3) a range of: −b% >$V_{AC}$>a fourth set value is determined as LOW zone.

Next, with reference to FIG. 5, there will be described an example of a detection circuit of an over-voltage/low voltage of input for detecting a voltage variance in accordance with a judgement standard. AC power source is rectified by a rectifier circuit 8 and converted into an AC which is controlled via converter portion of a switching power source consisted with an inverter circuit, etc. and then supplied to the compressor motor 5.

The output which is rectified by the rectifier circuit 8 has a predetermined voltage (such as 5.6 V) and divided by resistors R3, R4, R5 and transmitted as a reference input to one input terminal of each of the comparators IC1, IC2 of a comparator circuit 10. The power source voltage is divided by the resistors R1 and R2 and supplied directly to the other input terminals of the comparators IC1, IC2.

Figure 3:
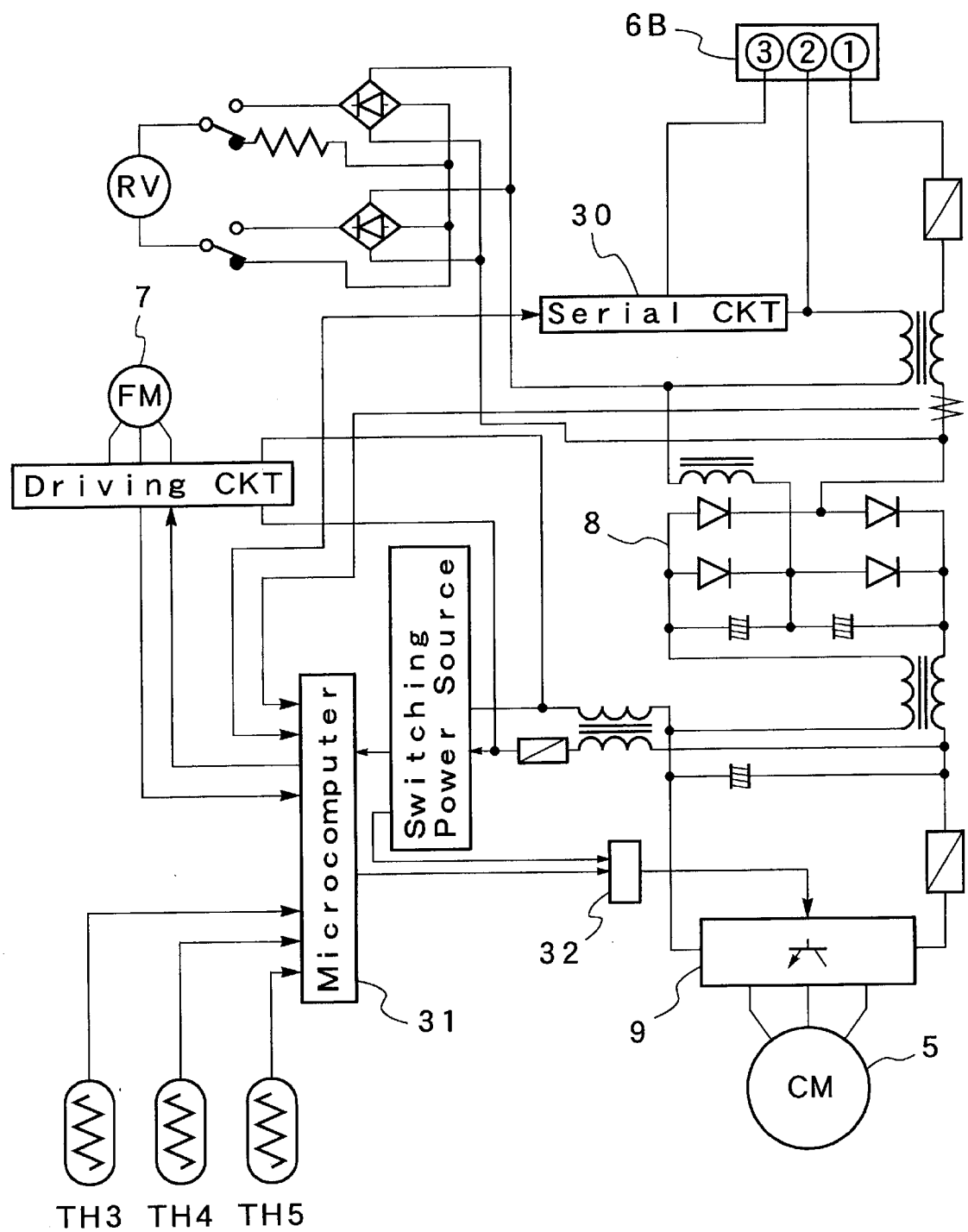
FIG. 3 is a diagram of an outdoor unit of the air conditioner showing a control portion thereof.

An output terminal is connected to a photo-coupler 11 consisted with PC1 and PC2. PC1 and PC2 are connected in series and from its output end portion, an output $V_{OUT}$ of the output terminal is supplied to the microcomputer 31 shown in FIG. 3.

In the detection circuit for over-voltage/low voltage input as described above, a zone judgement is made by the two comparators IC1, IC2 in accordance with the judgement standard shown in FIG. 4 (B), and (1) if $V_{AC}$>(is greater than) reference voltage +a% (first set value), PC1 of the photo-coupler 11 becomes ON and PC2 becomes OFF, and an output $V_{OUT}$ of the output terminal at its center connection becomes VH:

(2) if a reference voltage +a% (first set value) ≧$V_{AC}$≧a reference voltage −b% (second set value), PC1 of the photo-coupler 11 becomes ON and PC2 becomes OFF, and an output VOUT of the output terminal at its center connection becomes VM, and (3) if a reference voltage −b% (second set value)>(is grater than) VAC, PC1 of the phot-coupler becomes OFF and PC2 becomes ON, and an output of the output terminal at its center connection becomes VL.

The outputs VH, VM and VL of the three-step levels thus obtained from the output terminals is supplied to a microcomputer 31.

Similarly, $V_{AC}$ and the third set value and the fourth set value are compared by the circuit in which values of the resistors R3, R4 and R5 are changed, and judged by a signal which is outputted when VAC>(is greater than) the third set value or when the fourth set value>(is greater than) $V_{AC}$.

By the microcomputer 31, (a) the power source is supervised at all times, (b) when the voltage becomes beyond the normal operation range, a voltage applied to the compressor 5 is adjusted so that an over voltage to the compressor motor when the power source voltage is high is prevented and stalling torque (that is, locking) of the compressor motor is prevented;

(c) The voltage applied to the compressor motor 5 is adjusted by selection (switching) of a voltage correction table applied to the compressor motor; and (d) When the voltage correction table is switched, a timer (time X) is set for adjusting a time for a switching operation so that a gentle shift is made to a new voltage correction table.

A brief explanation will be made with reference to an adjustment of the voltage applied to the compressor motor by the microcomputer.

The microcomputer 31 controls an operation of the outdoor unit 1 according to an input signal and generates a switching signal for obtaining a pseudo sine wave based upon the PWM theory. A switching signal generated by the microcomputer 31 is supplied to the inverter circuit 9 through an amplifier for switching.

Figure 7:
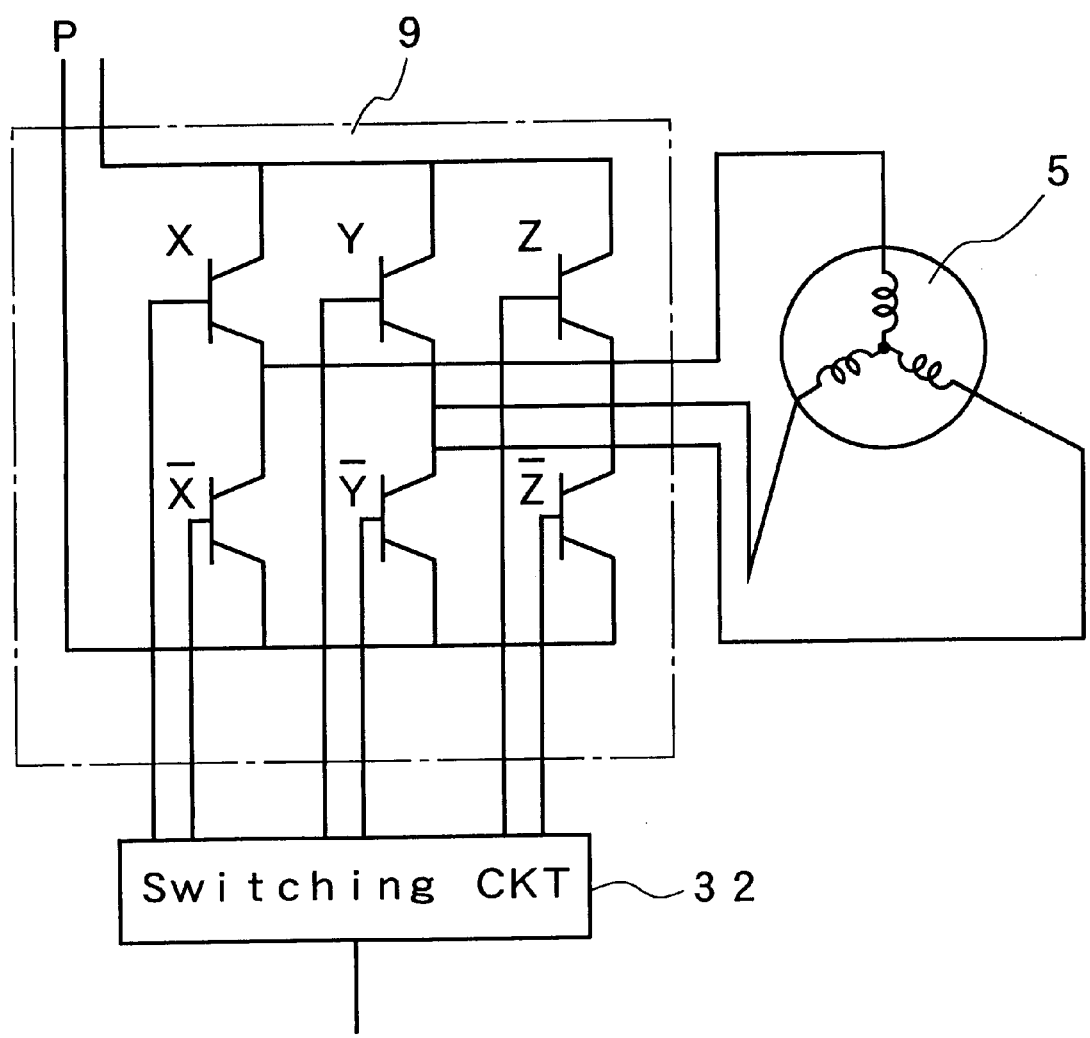
FIG. 7 is a circuit diagram of an inverter circuit.

The inverter circuit 9 has, as shown in FIG. 7, a circuit construction in which six power switching elements (X, X with bar, Y, Y with bar, Z, and Z with bar) are connected in a three-phase bridge fashion, and DC power is applied to an end P. As the six power switching elements, power transistors, power FET, IWGT, etc. can be used. The six switching elements are made ON and OFF in response to the switching signal and pseudo sine wave of three-phase are supplied to the compressor motor 5.

Figure 8:
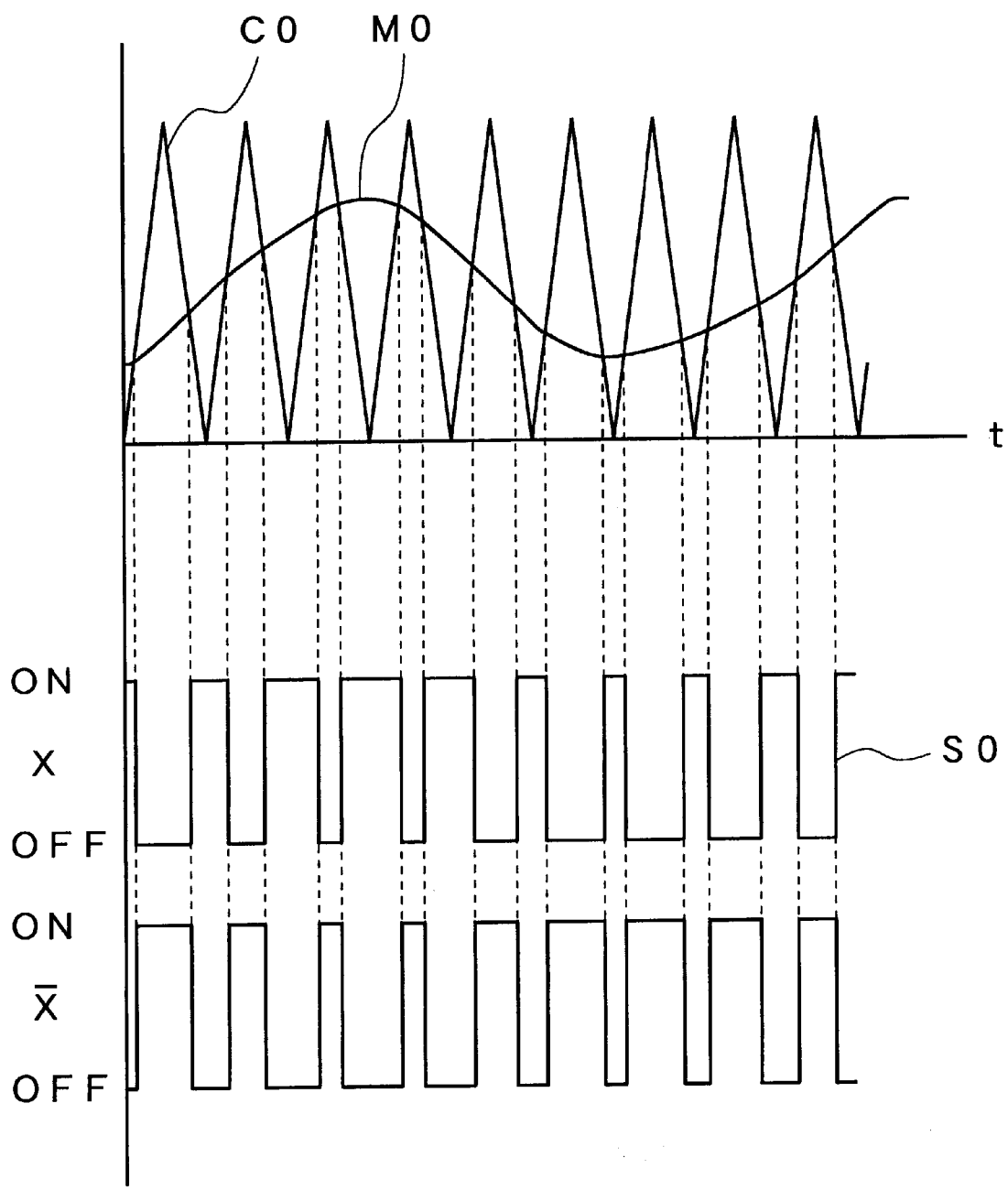
FIG. 8 is a diagram showing a principle of generation of a switching signal.

The DC power supplied to the inverter circuit 9 is obtained by rectifying the AC power by the rectifier circuit 8. FIG. 8 shows a principle of generation of a switching signal by the microcomputer 31, and this shows the case in which ON/OFF signals (that is, switching signals) are obtained by the switching elements X, X with bar, shown in FIG. 7. The ON/OFF signals of the switching element (X with bar) are those which are reversed from ON/OFF signals of the switching element X.

In FIG. 8, a waveform C0 represents a carrier wave (for example, a triangular wave, step-shaped triangular wave, sine (sinusoidal) weave, etc.) and the other waveform M0 represents a modulated wave (for example, sine wave, step-shaped sine wave, etc.). The ON/OFF signals are determined by the amplitude of the carrier wave C0 and the modulated wave M0. When the modulated wave M0>the carrier wave C0, ON/OFF signals S0=ON. The frequency and frequency ratio of the carrier wave C0 and the modulated wave M0 are not limited to those shown in FIG. 8 which shows an exemplified frequency for the purpose of simplification only.

ON/OFF signals of the switching element Y is generated by advancing a phase angle of the modulated wave M0 of FIG. 8 by 120 angular degrees and comparing the amplitude of the modulated wave M0 and the carrier wave C0. The ON/OFF signals of the switching element (Y with bar) is obtained by reversing the ON/OFF signals of the switching element Y. Further, the ON/OFF signals of the switching element Z is obtained by delaying the phase angle of the modulated wave M0 of FIG. 3 by 120 angular degrees and comparing the amplitude of the modulated wave M0 and the carrier wave C0. The ON/OFF signals of the switching element (Z with bar) is obtained by reversing the ON/OFF signals of the switching element Z.

When the ON/OFF signals (switching signals) are supplied to the inverter circuit 9, the DC power is made ON/OFF by the switching elements (X, X with bar, Y, Y with bar, Z, and Z with bar)in the same pattern as the duty ratio of the ON/OFF signals applied to the inverter circuit 9, and a pseudo sine wave is generated by chopping the DC voltage.

Cycle of the modulated wave M0 is correspondent with a frequency F of pseudo-sine wave and, accordingly, the frequency F of the pseudo-sine wave can be modified by changing the cycle of the modulated wave M0. Further, since the number of ON/OFF switching in one cycle of the pseudo-sine wave will increase by reducing the cycle of the carrier wave C0, the discrimination of the pseudo-sine wave is improved. In FIG. 8, the frequency of the carrier wave is illustrated larger for the purpose of explanation only.

Figure 9:
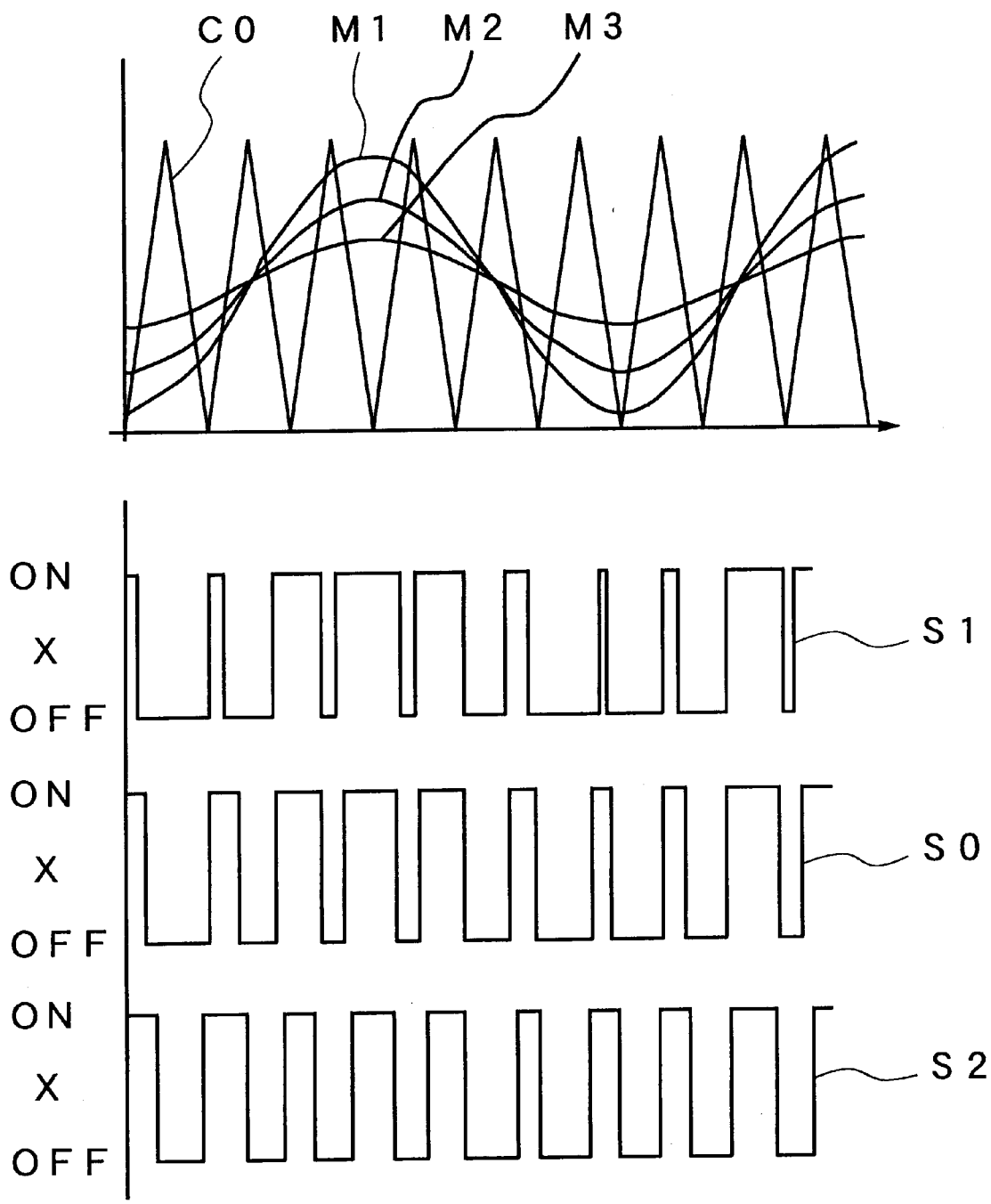
FIG. 9 is a diagram showing a state of switching signal at the time of amplitude change of a modulated wave.

FIG. 9 shows a modification or change of ON/OFF signals when an amplitude of the modulated wave is modified. When the amplitude of the modulated wave is increased to shift from M0 to M1, the pseudo-sine wave also is shifted from the state S0 to the state S1, and a pseudo-electric voltage (that is, theoretical terminal voltage on both ends of the exciting coil when an electric current of pseudo-sine wave is applied to a induction motor) is increased. A difference between a maximum ON time and a minimum ON time becomes large, with the result that the pseudo-electric voltage becomes higher. Further, when the amplitude of the modulated wave is decreased and shifted from M0 to M2, the pseudo-sine wave moves to the state of S2, with the result that the pseudo-electric voltage becomes lower.

Accordingly, a change of the amplitude of the modulated wave permits a change (modification) of the voltage of three-phase AC which is supplied to the induction motor, and similarly, a change of the frequency of the modulated wave permits a change (modification) of the frequency of the three-phase AC.

Figure 10:
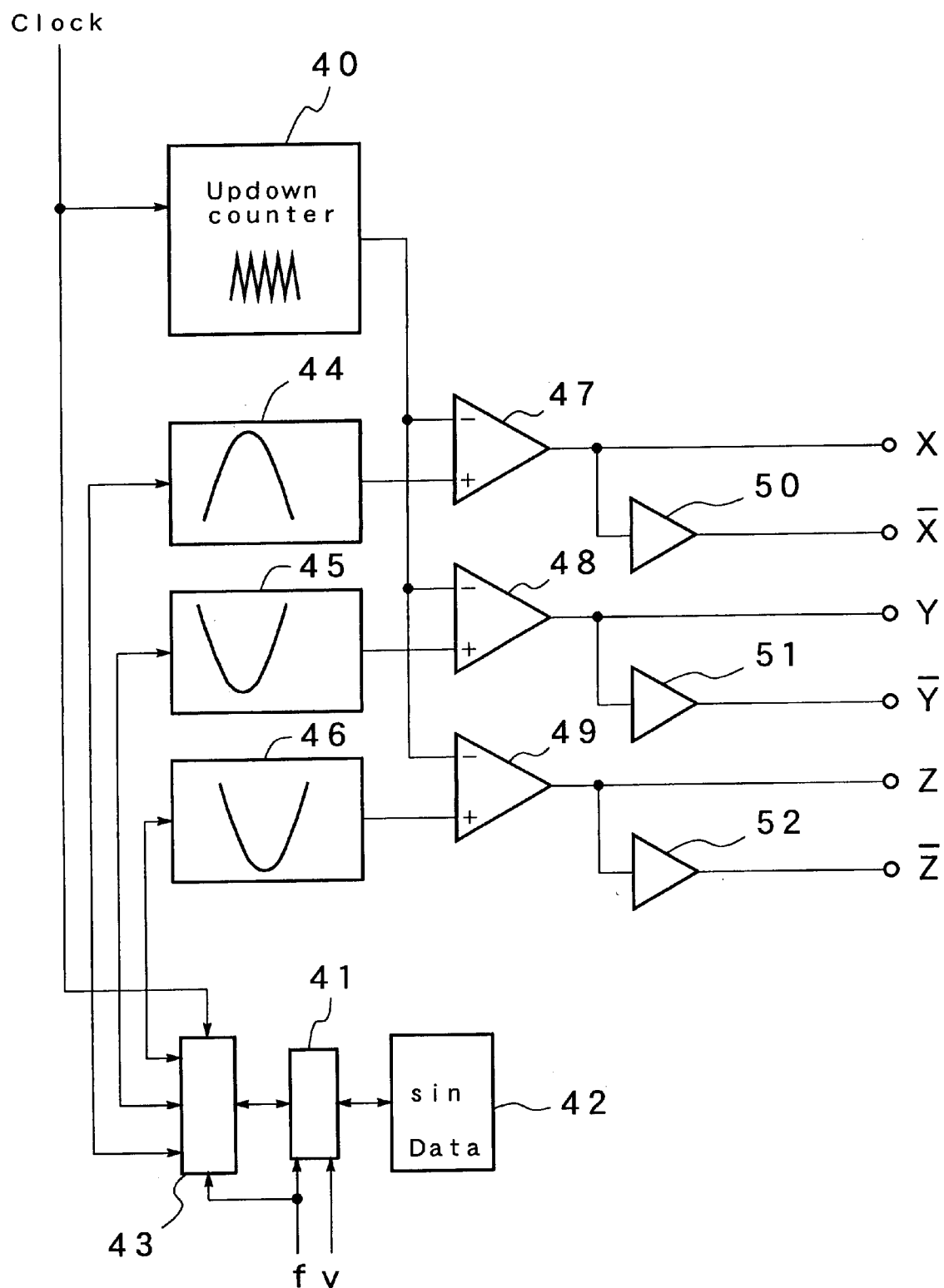
FIG. 10 is a diagram showing a generation of a switching signal.

In FIG. 10 which shows a principal portion of the microcomputer 31 for generating the ON/OFF signals (switching signals), an up/down counter 40 for counting OH-FFFFH of 16 bits serves for addition (summing) of counted values in synchronism with a clock. When the counted value reaches FFFFH, it proceeds subtraction in synchronism with the clock, and when the counted value reaches OH, it returns to the procedure of addition of the counted values and, thus addition and subtraction are repeated alternatingly. Accordingly, the conversion of the output (counted values) of the counter 40 into a voltage values will be able to provide a triangular wave (carrier wave).

Reference numeral 41 represents a sine wave control portion to which a frequency demand value f which demands a frequency F and a voltage demand value v for demanding a voltage V (pseudo voltage), and a sine wave which corresponds to these demand values is formed in the region of storage (memory) in the form of data variation of 0 to FFFFH.

In the storage portion 42, sine wave data is (frequency demanding value f, voltage V which is a pseudo-voltage) is stored at and interval of 0.1 Hz. An amplitude of the sine wave data becomes larger as the frequency becomes higher. In other words, it is set that a value of V/f becomes constant relative to a predetermined loss, so that if the frequency demanding value f and the voltage demanding value v are obtained, a new sine wave data can be restored in the storage region.

In FIG. 10, a distributor 43 generates values each of which is offset by 120° with adjacent ones. Thus, if a frequency demanding value f and a voltage demanding value v are given, three-phase sine waves each of which is deviated or offset by 120 angular degrees in frequency F and voltage V can be obtained.

Figure 1:
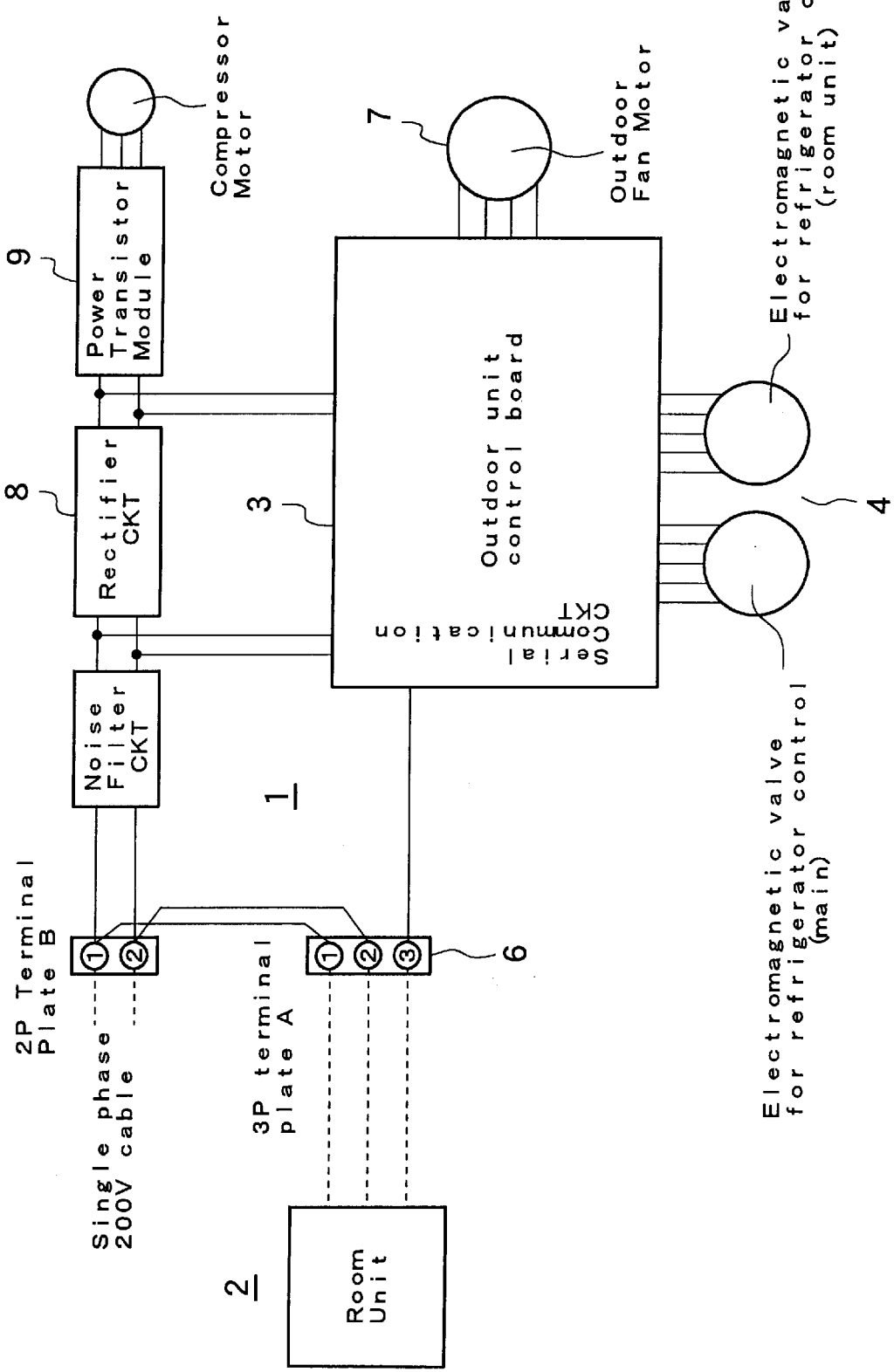
FIG. 1 is a diagram of a separate type air conditioner showing a general structure of the air conditioner.
Figure 2:
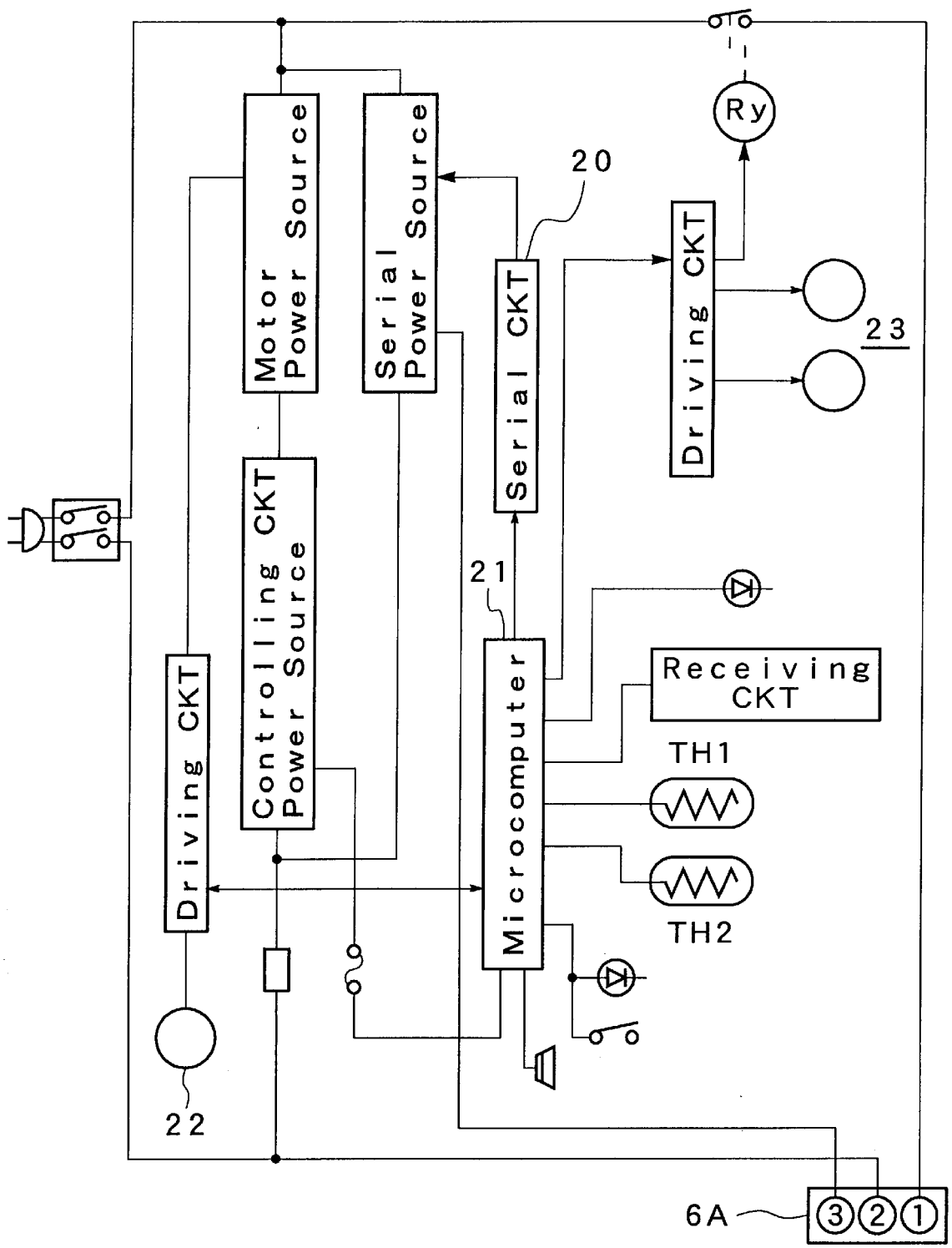
FIG. 2 is a diagram of a room unit of the air conditioner showing a control portion thereof.

In FIG. 10, reference numerals 47–49 represent comparators which compare the values. The comparators 47–49 compare a value of a triangular wave (carrier wave) which is supplied from the up/down counter 40 and a value of the sine wave (modulated wave) represented by the waveforms 44–46. When the value of the modulated wave is larger than the value of the carrier wave, the output is made ON (H level voltage). The outputs of the comparators 47 to 49 are supplied as switching signals (ON/OFF signals) of the switching elements X, Y, and Z, respectively, shown in FIG. 2.

Inverting circuits 50–52 serve to inverse the ON/OFF outputs from the comparators 47–49 to provide switching signals (ON/OFF signals) of the switching elements (X with bar, Y with bar and Z with bar). Thus, when the frequency demand value f and the voltage demand value v (in the range of 1.00–0.50) are transmitted to the sine wave control portion 41 of the microcomputer 31, AC power of desired frequency F and amplitude (voltage) V can be obtained.

Next, an adjustment operation of an output of the inverter circuit at the time of Variation of the power source voltage will be explained. In response to each zone of the HI zone, MID zone and LOW zone of FIG. 4(B), a voltage correction table for the voltage applied to the compressor motor (that is, changed voltage demand value v) is prepared. In other words, the microcomputer 31 is provided with a voltage correction table at a high level voltage, a voltage correction table at a low voltage level and a voltage correction table at a normal or regular level of voltage, and the voltage correction tables are set such that v/f (=F0) is constant with respect to the frequency F and voltage V.

Figure 5:
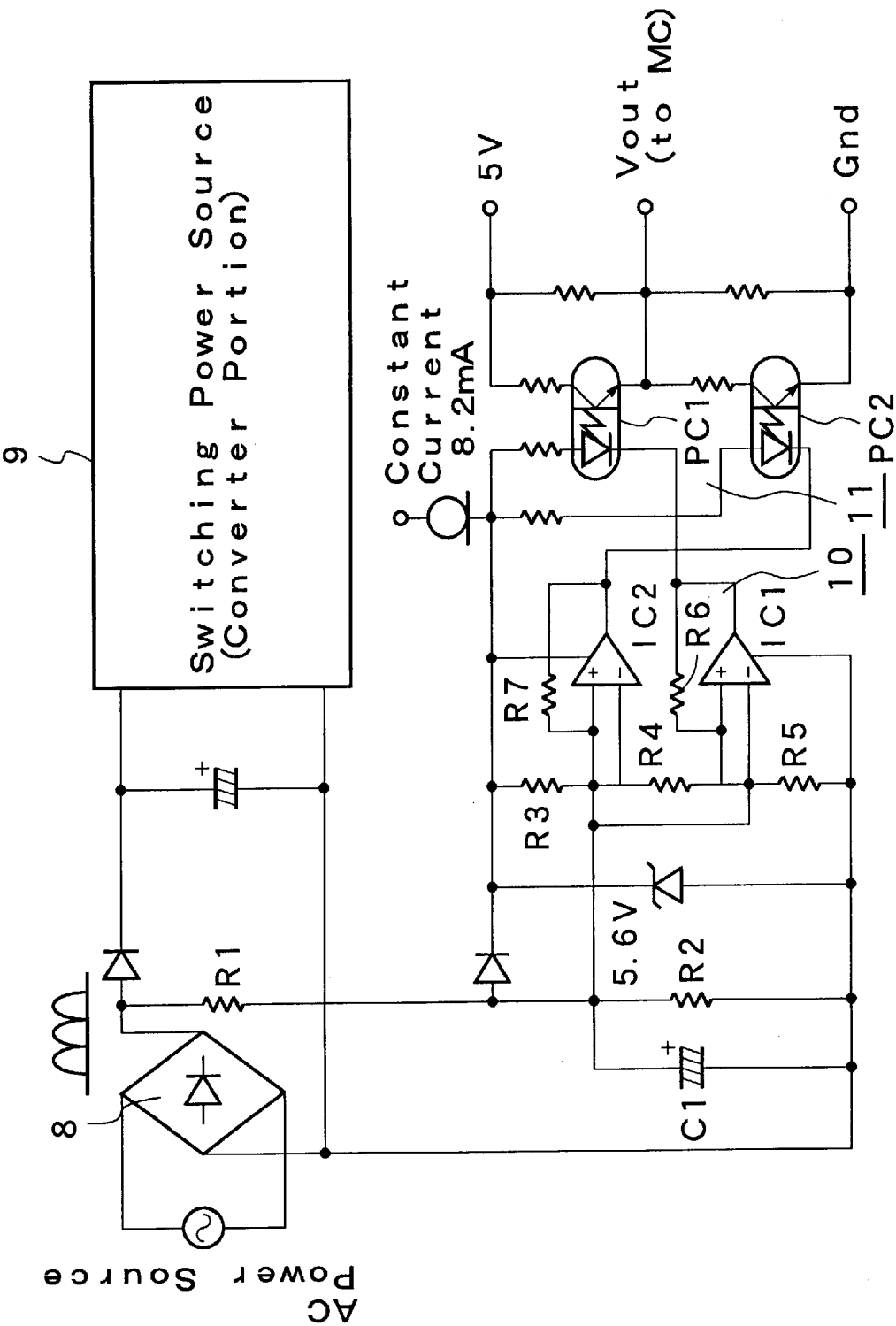
FIG. 5 is a circuit diagram of a detection circuit for detecting an input of over-voltage/low voltage.

In an adjustment of the voltage in each of the HI zone, MID zone and LOW zone, when the input over-voltage/low voltage detection circuit shown in FIG. 5 detects that the power source voltage VAC is larger than the reference voltage +a% and is within the range of the HI zone shown in FIGS. 4(A) and 4(B), the microcomputer 31 serves to proceed the selection (switching) of a voltage correction table at a high level of voltage which has been prepared for correction to a target voltage, in response to the HI zone.

When the input over-voltage/low voltage detection circuit of FIG. 5 detects that the power source voltage $V_{AC}$ is smaller than the reference voltage −b% and is within the range of the protective operation range of the LOW zone shown in FIGS. 4 (A) and 4(B), the microcomputer 31, in response to the LOW zone, proceeds the selection (switching) of the voltage correction table at a low level of voltages which has been prepared for correction to a target voltage.

In addition, when the input over-voltage/low voltage detection circuit of FIG. 5 detects that the power source voltage VAC is near th(e reference voltage and is within the protective operation range of the MID zone of FIGS. 4(A) and 4(B), the microcomputer 31, in response to the MID zone, proceeds the selection (switching) of the voltage correction table at a low level of voltage which has been prepared for correction to a target voltage.

Accordingly, in accordance with v/f (=F0) of the voltage correction tables at each of the zones, a frequency demand value f which demands the frequency F, and a voltage demand value v which demands the voltage V (pseudo-voltage), respectively, of the sine wave control portion 41 of the switching signal generator circuit of FIG. 10 are applied as an input, and its sine wave is formed in the storage regions, and the voltage which is applied to the compressor is adjusted by the voltage controlling method described above.

When selection (switching) of the voltage correction tables is proceeded, in order to avoid a shock to the voltage correction table, a gentle shift with a considerable time being spent must be made from the present voltage correction table to the selected voltage correction table. Consequently, a relation is performed as the relation between the frequency and motor voltage as shown in FIG. 6(A), and the dotted lines in FIG. 6(A) show the case of a single voltage correction table, in which an over-voltage is provided to the windings (coils) of the motor to possibly provide an undesirable stalling (locking) state of the compressor motor.

Figures 6A, 6B:
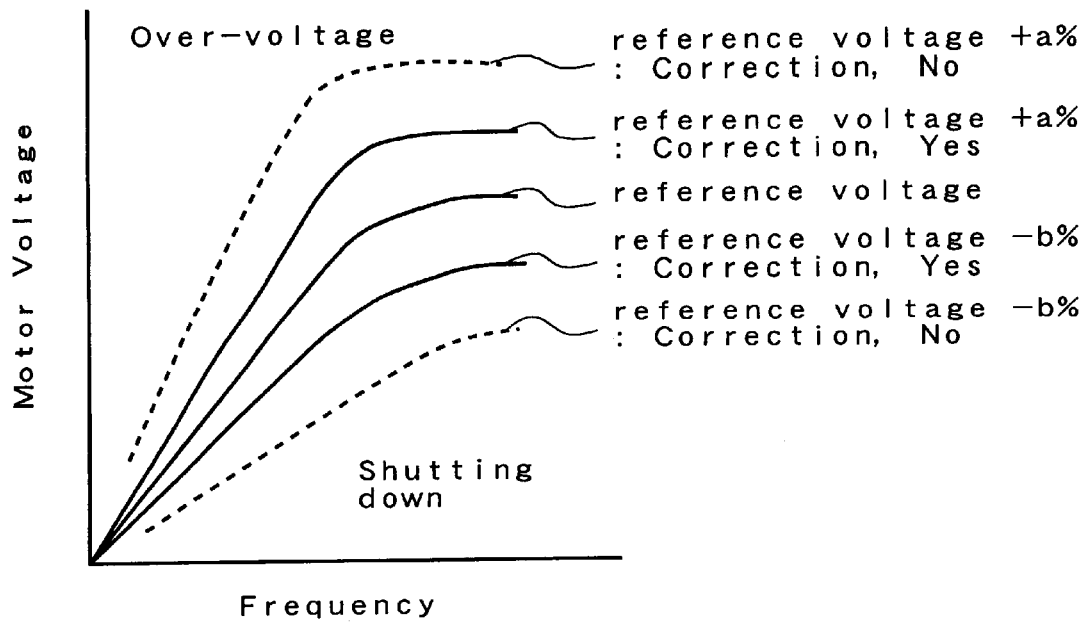
FIGS. 6 (A) and (B) are graphs and diagrams, respectively, showing voltage correction.

On the other hand, the solid lines in FIG. 6(A) represent the case that selection (switching) is made from a plurality of voltage correction tables, in which case the voltage to be applied to the compressor is adjusted so as to avoid the above-described disadvantages of over-voltage to the coils and stalling (locking) of the motor.

Figure 11:
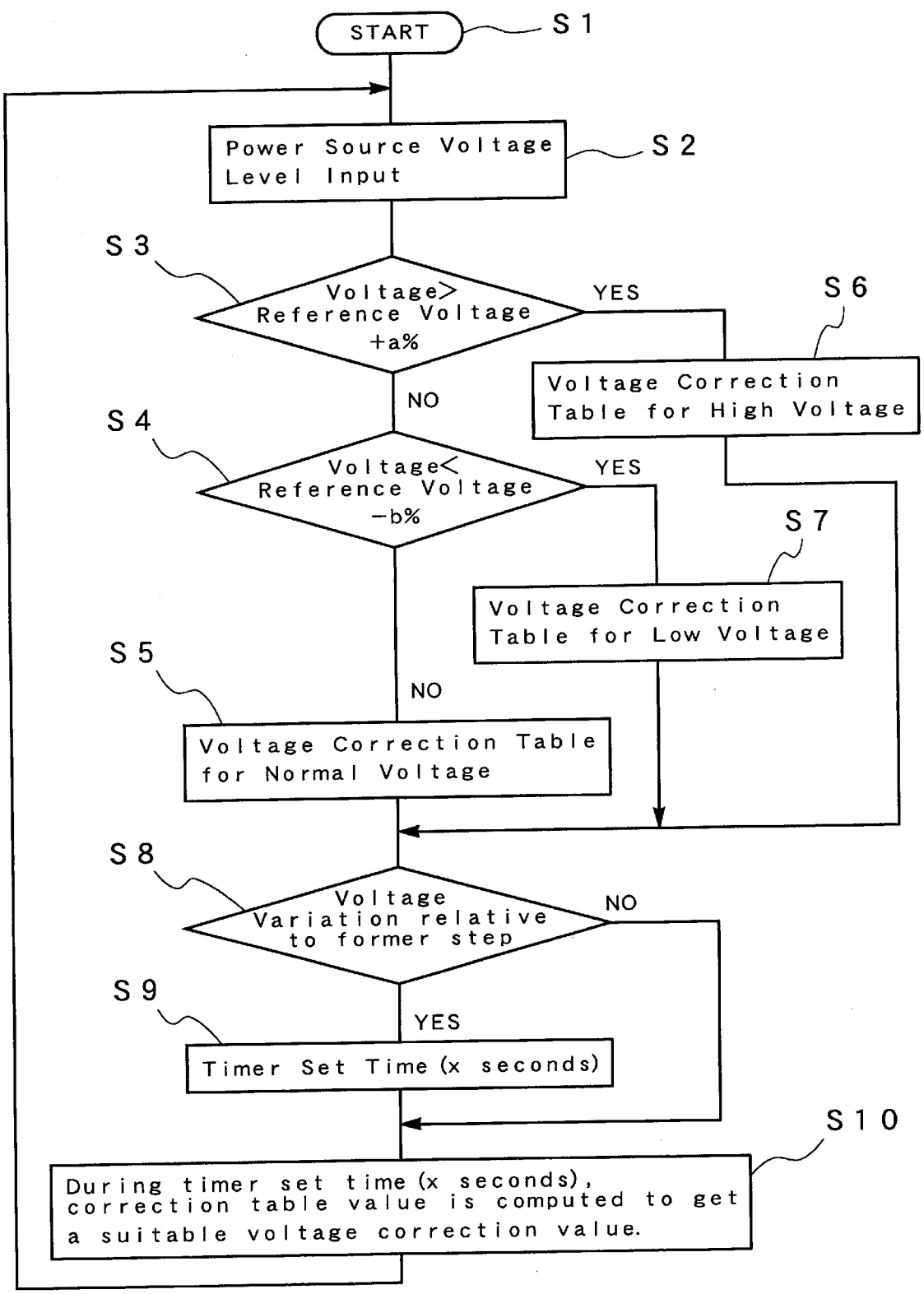
FIG. 11 is a diagram showing a process of voltage adjustment by a microcomputer.

With reference to FIG. 11, in case of the voltage correction at each zone of the HI zone, MID zone and LOW zone, an adjustment of the voltage applied to the compressor motor at the time of power source voltage variation, in the microcomputer 31, will be explained.

When the process starts at step S1, an input of the power source voltage level is received at step S2. At step S3, judgement is made whether or not a power source voltage> (is greater than) a reference voltage +a%. If a power source voltage>(is greater than) a reference voltage +a% is not satisfied, that is, if this inequity is not satisfied, the process proceeds to step S4.

In step S4, judgement is made whether the power source voltage<(is smaller than) the reference voltage −b%, and if this inequity is not satisfied, in other words, if the reference voltage +a% $\geq V_{AC} \geq$ reference voltage −b% is satisfied and the power source voltage is within the normal operation range, the process proceeds to step S5 at which the voltage correction table for the normal (regular) time is selected.

In step 3, if the power source voltage>(is greater than) the reference voltage +a%, the process proceeds to step S6, the voltage correction table for a high voltage case is selected and then the process proceeds to step S8. Further, in step S4, if the power source voltage < (is smaller than) the reference voltage −b%, the process proceeds to step S7 at which the voltage correction table for a high voltage case is selected and then proceeds to step S8.

In step S8, a judgement is made whether or not there is a power source voltage variation relative to the preceding case. If there is a variation, a timer is set at step S9 to obtain a time (x seconds), and the process proceeds to step S10. Further, an judgement is made to decide that there is no variation of power source voltage, the process proceeds to step S10.

In step S10, a voltage correction table value is computed during the time (x seconds) of the timer to obtain an optimum voltage correction value. Namely, in accordance with v/f (=F0) of the voltage correction table, the frequency demand value f which demands the frequency F, and the voltage demand value v which demands the voltage V (pseudo-voltage), respectively, for the sine wave control portion 41 of the switching signal generation circuit shown in FIG. 10 is provided as an input, and its sine wave is formed in the storage region, and then the voltage applied to the compressor motor is adjusted by the same method of voltage control as described above and, then the process returns to step S2 to repeat the similar processes.

Next, a case in which correction is made to change the zones will be explained. The value F0 of original (pre-change) zone (=v/f) is set as a basis, the value of F0 is changed to a target zone to be changed. Namely, there will satisfy the following formula:

Present value of F0=F0 value of pre-change zone+an adjustment value

The adjustment value serves to proceed comparison between a F0 value of a changed zone and a F0 value of the present time at a slow time interval (for example, every 10 seconds interval), and in accordance with the range of the differences x1, x2, . . . , x7, 0, −x1, −x2, . . . , −x7, modification of the adjustment values, n1, n2, n3, n4, 0, −n1, −n2, −n3, −n4 will be made as shown in FIG. 6(B).

When the modification value for the adjustment value is more than n2, inclusive or less than −n2, inclusive, it is modified at a rate of high speed (for example, 0.5 second). When the value of F0 becomes a F0 value of the case in which present F0 value=F0 of the changed zone, the change of the zone is terminated. As a result, the zone change is made rapidly if the modification value "n" is in a large zone, and slowly on the other hand if the modification value is in a small zone. Further, the difference x and the modification value n may be of either continuity or discontinuity.

Thus, in accordance with renewed F0 values which are obtained from itime to time, the frequency demand value f which demands the frequency F, and the voltage demand value v which demands the voltage V (pseudo-voltage) ,respectively, for the sine wave control portion 41 of the switching signal generation circuit shown in FIG. 10 are provided as an input, and its sine wave is formed in the storage region, and then the voltage applied to the compressor motor is adjusted by the same method of voltage control as described above.

As described above, when the power source voltage is varied in each of the zones of a normal operation region, a high voltage operation region, and a low voltage operation region, the voltage correction table is selected to compute and obtain an optimum voltage supplied to the compressor motor so that the power supply to the compressor motors, etc. is continued without a cut-off of the power supply, and an over-voltage to the motor windings is restricted to prevent any burning to the motor. Further, since the reduction of motor torque is prevented to avoid stalling (locking) of the motor and, therefore, a continuous operation of the motor can be made as long as possible.

When the power source voltage is varied, the voltage correction table is selected and computed to supply a suitable voltage to the compressor motor and, at this moment, the computing operation is conducted by dividing it per a predetermined time so that an output. of the inverter circuit can be controlled and, therefore, the voltage applied to the compressor motor can be adjusted gradually. Accordingly, a smooth operation can be achieved.

In addition to the above, when a correction is made by changing the zone when the power source voltage is varied, the computing operation is divided into predetermined time intervals even when a difference of the corrected voltage is large, and in the region in which the difference of the corrected voltage is large, the divided time interval is made short to proceed adjustment rapidly, and in the region in which the difference of the corrected voltage is small, an input of the inverter circuit can be controlled at a slow timing by making it longer (larger) the divided time interval. Therefore, the voltage supplied to the compressor motor is adjusted gradually so that a smooth operation and an efficient change of the zones can be obtained.

What is claimed is:

1. A controlling apparatus for an air conditioner, comprising:
    an inverter circuit means for outputting a pseudo-sine wave from a switching signal obtained by comparison between a modulated wave and a carrier wave,
    a refrigeration cycle means having a compressor driven by the pseudo-sine wave from the inverter circuit means, so that the modulated wave is adjusted in accordance with an air conditioning load,
    correction means for correcting an amplitude of the modulated wave into a smaller one at a predetermined time when a rated voltage of the power source from the inverter circuit means is larger than a rated voltage by a first predetermined value, and correcting the amplitude of the modulated wave into a larger one at a predetermined time when a rated voltage of the power source from the inverter circuit means is smaller than the rated voltage by a second predetermined value, and elongating the predetermined time as the difference between the aforementioned power source voltage and the rated voltage becomes larger so that shutdown of the compressor is restricted at the voltage variation of the power source.

2. A controlling apparatus according to claim 1, wherein a protection means is provided for shutting down the compressor when time duration that the power source voltage is more than the first predetermined value or less than the second predetermined value is arrived at a predetermined time duration.

3. A controlling apparatus according to claim 2, wherein the protection means has a means for shutting down the compressor when the power source voltage is more than a third predetermined value higher than the first predetermine value or the power source voltage is less than a fourth predetermined value smaller than the second predetermined value.

* * * * *